Jan. 14, 1941.   T. A. CLENDENING   2,228,813
WHEELLESS HAY RAKE
Filed July 22, 1939    2 Sheets-Sheet 2
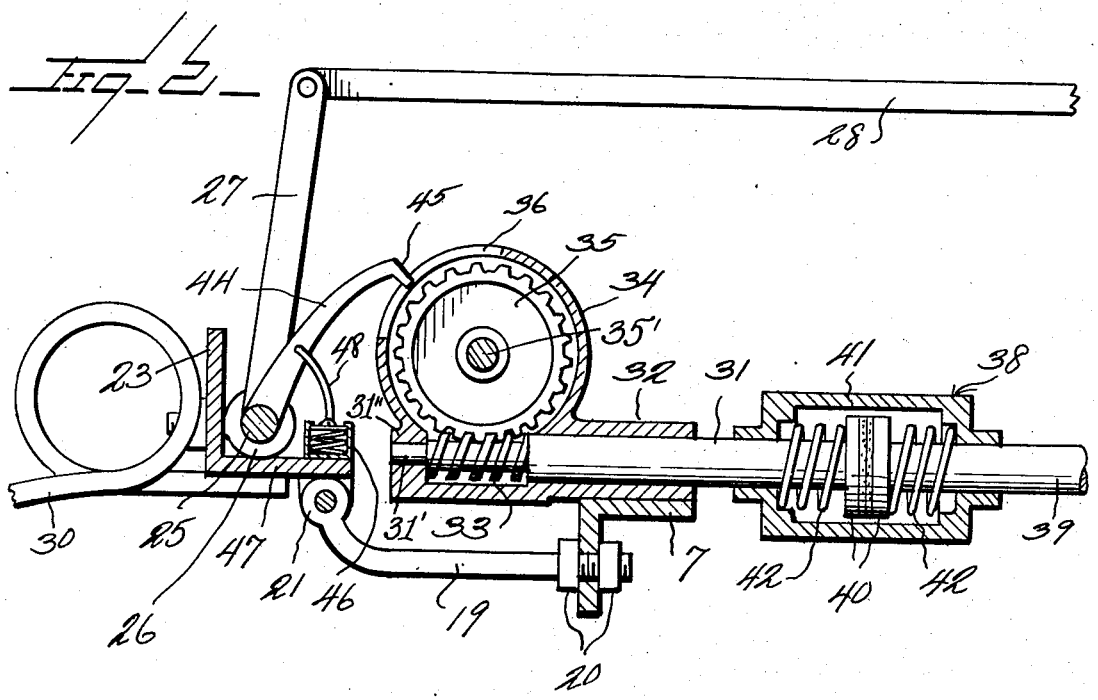
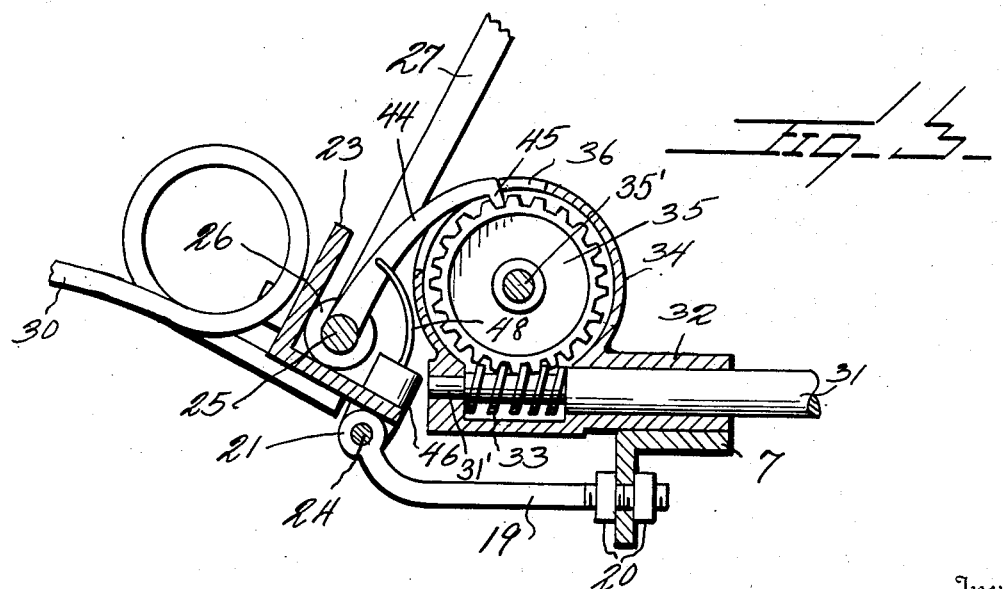
Inventors
T. A. Clendening
By Watson E. Coleman
Attorney Patented Jan. 14, 1941

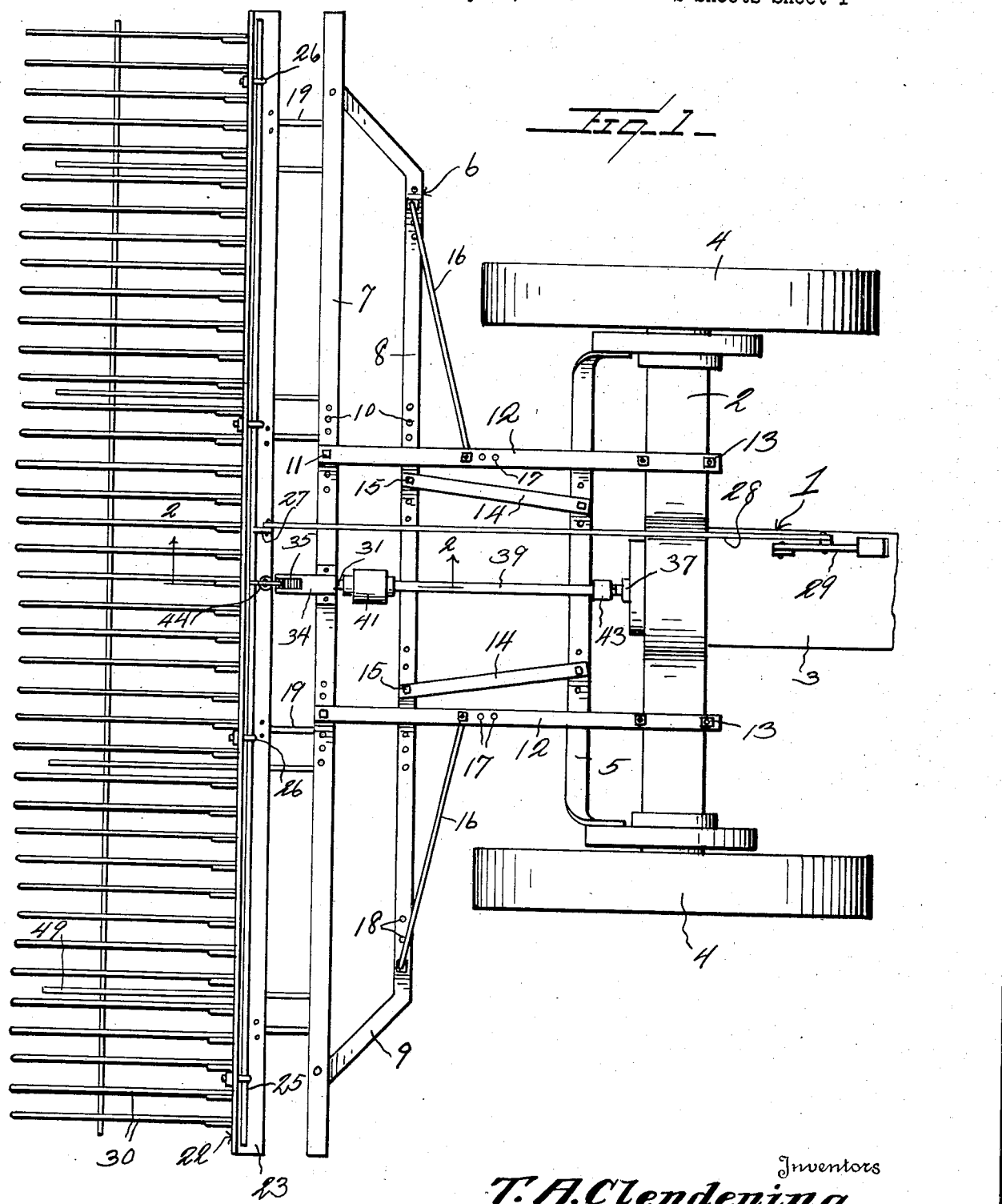

2,228,813

UNITED STATES PATENT OFFICE 2,228,813

WHEELLESS HAY RAKE

Thomas A. Clendening, Nampa, Idaho

Application July 22, 1939, Serial No. 285,991

5 Claims. (Cl. 56—27)

This invention relates generally to the class of power actuated rakes and pertains particularly to an improved wheelless rake structure.

The present invention has for its primary object to provide a novel and improved rake structure which is designed for attachment to the rear end of a tractor and which is so constructed that it will be suspended from the tractor and, therefore, obviates the necessity of using ground engaging supporting wheels such as are commonly employed for hay rakes.

Another object of the invention is to provide a novel wheelless hay rake having means associated therewith whereby the dumping of the rake may be accomplished mechanically through the medium of a connecting means between the rake proper and the power take-off of the tractor to which the rake is attached.

Still another object is to provide in a tractor drawn rake, a novel mechanism for establishing an operative coupling between the rake proper which is oscillatably mounted and a rotating gear which is driven from the power take-off of the tractor, whereby the rake will be raised or rocked to a lifted position for the release of hay which it has scraped up.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in top plan of the rake structure and supporting means constructed in accordance with the present invention.

Fig. 2 is a sectional view taken on the line 2—2 of Fig. 1, showing on an enlarged scale the rake tripping mechanism, the beam 8 not being shown.

Fig. 3 is a view similar to Fig. 2, but showing the tripping mechanism in operation.

Referring now more particularly to the drawings, the numeral 1 generally designates the rear end portion of a tractor structure which includes the usual rear axle housing 2, a portion of the tractor body 3, the rear drive wheels 4, and the drawbar 5 which is connected to the housing of the wheel gears rearwardly of the axle housing.

The hay rake structure embodying the present invention consists of a rigid or fixed frame generally indicated by the numeral 6 and comprising a main transverse beam 7 and a forward parallel auxiliary frame beam 8, the end portions of which are obliquely extended as indicated at 9 and rigidly secured to the beam 7 adjacent the ends of the latter.

The frame beams 7 and 8 are provided intermediate their ends with the spaced groups of bolt apertures 10, the beam 7 receiving bolts 11 by means of which a pair of drawbars 12 are joined at their rear ends thereto, as shown in Fig. 1. These drawbars 12 are in spaced parallel relation and extend longitudinally of the tractor structure and have their forward ends disposed across the axle housing 2 and secured thereto by suitable connectors such as U-bolts or the like, the ends of such bolts being indicated at 13. As a bracing means by which the frame 6 is rigidly supported horizontally rearwardly of the tractor, the brace bars 14 are provided which have their rear ends attached to the beam 8, by bolts 15 which engage in the apertures 10 of this beam, and their forward ends are connected with the drawbar 5 of the tractor, this bar being in a lower plane than the axle housing 2 resulting in the brace bars extending at an upward inclination toward the rearwardly disposed beam 8 so that these bars 14 provide an effective bracing support for the rake carrying frame.

The bars 16 form lateral braces between the drawbars 12 and the outer ends of the rake carrying frame, being adjustably coupled at their inner ends by each having an angularly turned end portion for selective engagement in the several apertures 17 in the bar 12, while the other end of each bar 16 is similarly angled for selective engagement in apertures 18 in the adjacent outer end of the beam.

The beams 7 and 8 are preferably of angle construction or form as shown in Figs. 2 and 3, where the rearmost beam 7 is shown in cross-section. The downwardly directed flange of the beam 7 has secured thereto a number of short rearwardly directed arms 19, one end of each of which carries the two nuts 20 between which the flange of the angle beam is clamped while the other end is curved or turned upwardly and terminates in a hinge eye 21. These arms 19 support at their rear ends the rake unit which is generally indicated by the numeral 22 so that such unit may oscillate vertically or about a horizontal axis. The rake unit consists of an angle beam 23 which is disposed parallel with the beam 7 and this angle beam 23 carries on its underside, between suitable spaced ears, the horizontal pivot pins 24, each of which passes through an eye 21 of an arm 19.

Upon the top of the rake beam 23 there is supported a rock bar 25 which passes through hinge eyes 26 which are secured to the beam 23, as shown in Figs. 2 and 3. This rock bar 25 carries intermediate its ends an upwardly directed lever 27 to the upper end of which is pivotally connected a pull rod 28 which extends forwardly to a suitable foot lever 29 which is carried upon the tractor and which is in a position of easy accessibility for the operator of the tractor so that by depressing the lever 29, the rod 28 to which it is attached will be shifted so as to oscillate the crank 27 and the shaft 25.

To the rake beam 23 there are attached the upper ends of the rake tines 30. This attachment may be effected by welding the ends of the tines to the beam or in any other suitable manner which will secure the tines against movement relative to the beam so that when the beam 23 is rocked on the pivot pins 24, the ends of the tines will be lifted from the ground.

In order to facilitate the raising of the rake unit, the mechanism shown in detail in Figs. 2 and 3 is provided. This mechanism comprises a worm shaft 31 which is suitably supported in a bearing 32 mounted upon the beam 7 of the fixed frame unit 6, and a portion of this shaft is formed to provide the worm 33. Integral with the bearing 32 is a worm wheel housing 34 in which a worm wheel 35 is rotatably supported by a short shaft 35' which has its ends suitably rotatably mounted in opposite side walls of the housing 34. The upper rear portion of this housing 34 has an opening 36 therethrough for the purpose hereinafter stated. This worm shaft 31 extends longitudinally of the rake structure between the drawbars 12 for alinement with the power take-off 37 of the tractor and the worm 33 lies in the lower part of the housing 34 being geared to the wheel 35 as shown and having a rear end stem 31' enclosed in a suitable bearing 31'' forming a part of the housing.

The numeral 38 designates a clutch unit between the shaft 31 and a coupling shaft 39. This clutch may be of any suitable form but is here shown as consisting of a pair of disks 40 enclosed within a housing 41 and each carried by a shaft, the disks being forced together by springs 42 disposed between them and the ends of the housing. The shaft 39 has longitudinal movement and, therefore, the disk parts may be readily held in frictional contact so that in the event of any interference with the turning of the shaft 31 or of the gear 35, the shaft 39 may be rotated without damaging the mechanism. At the opposite end of the shaft 39 is a collar or housing 43 having a squared interior or an interior of any other polygonal form for the reception of the squared end of the power take-off shaft 37. Thus the shaft 39 is coupled with the power take-off in such a way that it may have slight longitudinal movement as stated.

Secured to the rock shaft 25 directly rearwardly of the gear 35 is a latch dog or hook 44 which is normally inclined forwardly as shown in Fig. 2, and has the bill 45 thereof directed into the opening 36 whereby upon oscillation of the rock shaft 25, the bill will be moved into position between a pair of the teeth of the gear 35. This rocking of the shaft 25 is accomplished by means of the foot operated bar or rod 28 to move the dog 44 into coupling relation with the gear 35, and when this is done the rake beam 23 will be lifted as shown in Fig. 3, so as to raise the ends of the rake tines from the ground and thus release the material which they have gathered up.

Disposed adjacent the dog 44 is a trip mechanism for the dog which comprises a casing 46 in which is housed an expansion spring 47 and supported upon the top of this spring is a pair of arms 48 which extend upwardly on opposite sides of the dog and are connected therewith. Thus it will be seen that when the dog 44 is swung down toward the gear 35, the spring 47 will be compressed and the operator of the mechanism must hold the pull rod 28 to maintain the operative coupling between the gear 35 and the dog while the rake is being raised. By releasing the rod 28 the spring 47 will operate to kick the dog out of engagement with the gear thus allowing the rake to swing back into working position.

From the foregoing description, it will be readily apparent that the rake structure embodying the present invention is of relatively simple construction and may be readily mounted upon the rear of a tractor so that the need for supporting wheels or other ground engaging units is eliminated and the rake may be readily raised or tripped as required for the release of material gathered up thereby, without material effort on the part of the operator of the tractor to which the rake is attached.

Suitable means may be provided for effecting the removal or withdrawal of the ends of the rake tines from the raked up hay as the tines are raised as, for example, the beam 7 may have attached thereto the rearwardly extending arms 49 which pass between the tines of the rake and which are held stationary so that when the tines are raised, the tines will move relative to the arms and will have the hay pulled off of them so that the rake will be entirely freed of the hay.

What is claimed is:

1. A hay rake structure of the character described for attachment to the rear of a draft machine having a power take-off, comprising an elongated rigid frame designed to extend transversely of the rear of the machine, means for securing the frame to the machine whereby the frame will be supported solely by said securing means rearwardly of the machine and horizontally above the ground, a rake unit including a beam and tines attached to the beam, means pivotally coupling said beam with said frame and in spaced parallel relation with the frame, a wheel rotatably supported upon the frame, means for coupling the wheel with said power take-off to effect constant turning of the wheel by the machine, and a latching mechanism operable from the machine and carried by the raking unit for connection with said wheel to effect the oscillation of the beam and the raising of the tines of the unit.

2. A hay rake structure, comprising an elongated rigid frame adapted to be secured transversely of and to the rear of a draft machine having a power take-off, drawbars coupling the frame with the machine, brace bars for connecting the frame with the machine whereby the frame will be supported solely by the drawbars and brace bars rearwardly of the machine and horizontally above the ground, a rake unit comprising a beam and rake tines attached thereto, said rake unit beam being disposed rearwardly of and in spaced relation with said frame, means coupling said beam with the frame whereby the raking unit may have vertical swinging movement, a toothed wheel rotatably supported on the frame, connecting means between said wheel and said power take-off whereby the wheel is constantly rotated, an oscillatable latch dog carried by the beam and adapted to be coupled with the teeth of said wheel, and means operable from a remote point with respect to the unit for oscillating said dog into connection with said wheel teeth to effect the raising of the rake unit.

3. A hay rake structure adapted for connection to the rear of a draft machine having a power take-off, comprising an elongated frame adapted to be disposed transversely of the machine, a pair of draft beams connected with said frame and adapted to be coupled with the machine, a pair of brace arms for coupling the frame with the machine, the frame being supported solely by the beams and brace arms horizontally from the machine, a rake unit including raking tines and a beam to which the same are connected, said beam being disposed in spaced parallel relation with said frame, supporting arms extending rigidly rearwardly from the frame and having pivotal connection with said beam whereby the rake unit may be vertically oscillated on the arms, a rock shaft on and extending longitudinally of said beam, a dog rigid with said shaft and extending vertically therefrom, a power unit supported upon the frame and connected with said power take-off and including a rotatable toothed wheel, said dog when rocked downwardly connecting with said toothed wheel to couple the power unit with the rake unit, and means for effecting the rocking of said rock shaft from a point remote from the rake unit.

4. A hay rake structure adapted for connection to the rear of a draft machine having a power take-off, comprising an elongated frame adapted to be disposed transversely of the machine, a pair of draft beams connected with said frame and adapted to be coupled with the machine, a pair of brace arms for coupling the frame with the machine, the frame being supported solely by the beams and brace arms horizontally from the machine, a rake unit including raking tines and a beam to which the same are connected, said beam being disposed in spaced parallel relation with said frame, supporting arms extending rigidly rearwardly from the frame and having pivotal connection with said beam whereby the rake unit may be vertically oscillated on the arms, a rock shaft on and extending longitudinally of said beam, a dog rigid with said shaft and extending vertically therefrom, a power unit supported upon the frame and connected with said power take-off and including a rotatable toothed wheel, said dog when rocked downwardly connecting with said toothed wheel to couple the power unit with the rake unit, means for effecting the rocking of said rock shaft from a point remote from the rake unit, and a spring kick-out mechanism connected with said dog whereby upon release of said rock shaft said dog will be shifted out of connection with said toothed wheel.

5. A hay rake structure for connection to the rear of a draft machine having a power take-off, comprising an elongated frame adapted to be disposed horizontally transversely of the machine, the frame including two spaced parallel longitudinally extending beams, a pair of draft beams connected with and extending transversely of the frame and adapted to be coupled with the machine, a pair of brace arms connected with one of said first beams and with the machine to brace the frame in an elevated position at the rear of the machine, the frame being supported clear of the ground solely by said draft beams and brace arms, a rake unit including rake tines and a beam to which the tines are rigidly connected, said unit beam being disposed in spaced parallel relation with and rearwardly of the frame from the machine, a plurality of supporting arms each connected with the rearmost one of the beams of said frame and extending rearwardly therefrom, means forming a pivotal connection between the rake unit beam and said supporting arms whereby the rake unit is oscillatable on a horizontal axis, a dog member pivotally supported upon the rake unit beam, a power unit supported upon the frame beam adjacent the rake unit and including a rotatably supported worm shaft and a toothed worm wheel rotatably supported above and coupled with the worm shaft for rotation thereby, said dog and worm wheel being in a plane transversely of the rake unit whereby oscillation of the dog in one direction will bring the same into engagement with the teeth of the wheel, means for controlling the oscillation of the dog, a power transmitting shaft adapted for connection with said power take-off, and a friction clutch connection between the power transmitting shaft and the worm shaft.

THOMAS A. CLENDENING.